(12) United States Patent
Jonsson et al.

(10) Patent No.: US 8,737,415 B2
(45) Date of Patent: May 27, 2014

(54) PRIORITIZATION OF DATA PACKETS

(75) Inventors: Anders Jonsson, Täby (SE); Ina Widegren, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 346 days.

(21) Appl. No.: 13/170,368

(22) Filed: Jun. 28, 2011

(65) Prior Publication Data

US 2012/0002678 A1     Jan. 5, 2012

Related U.S. Application Data

(60) Provisional application No. 61/360,948, filed on Jul. 2, 2010.

(51) Int. Cl.
*H04L 12/28*     (2006.01)
*G06F 7/00*     (2006.01)
*G06F 17/30*     (2006.01)

(52) U.S. Cl.
USPC .......................... 370/412; 370/328; 707/799

(58) Field of Classification Search
USPC ....................................................... 370/412
See application file for complete search history.

(56) References Cited

U.S. PATENT DOCUMENTS 7,508,792 B2 * 3/2009 Petrovic et al. ............... 370/331
7,724,749 B2 * 5/2010 Terry et al. ................. 370/395.4

FOREIGN PATENT DOCUMENTS

WO     2011120581 A1     10/2011

OTHER PUBLICATIONS

3GPP TS 25.425 V7.11.0 (Jun. 2009), 3rd Generation Partnership Project; Technical Specification Group Radio Access Network; UTRAN Iur interface user plane protocols for Common Transport Channel data streams (Release 7) http://www.arib.or.jp/IMT-2000/V900Jul11/5_Appendix/Rel7/25/25425-7b0.pdf.*
3GPP TS 25.435 V9.2.0 (Jun. 2010), 3rd Generation Partnership Project; Technical Specification Group Radio Access Network; UTRAN Iub Interface User Plane Protocols for Common Transport Channel Data Streams (Release 9).
3GPP TS 25.306 V9.3.0 (Jun. 2010), 3rd Generation Partnership Project; Technical Specification Group Radio Access Network; UE Radio Access capabilities (Release 9).
3GPP TS 25.322 V.9.2.0 (Jun. 2010), Technical Specification Group Radio Access Network, Radio Link Control (RLC) protocol specification (Release 9).
Nichols et al, RFC 2474, "Definition of the Differentiated Services Field (DS Field) in the IPv4 and IPv6 Headers", Dec. 1998.
Babiarz et al, RFC 4594, "Configuration Guidelines for DiffServ Service Classes", Aug. 2006.

* cited by examiner

*Primary Examiner* — Noel Beharry
(74) *Attorney, Agent, or Firm* — Nixon & Vanderhye, P.C.

(57) ABSTRACT

A method of operating a telecommunications node (28) through which packets of differing priority are conveyed comprises receiving plural data packets from a source external (26) to the node, the plural data packets including both ordinary packets and a priority packet; and storing the plural data packets in a queue structure (36) in order of arrival so that the priority packet is read out of the queue structure before the ordinary packets are read out of the queue structure (36), thereby expediting output of the priority packet from the node relative to the ordinary packets.

14 Claims, 11 Drawing Sheets

PRIORITIZATION OF DATA PACKETS

This application claims the priority and benefit of U.S. Provisional Patent application 61/360,948, filed Jul. 2, 2010, entitled "PRIORITIZATION OF DATA PACKETS", which is incorporated herein by reference in its entirety.

TECHNICAL FIELD

This invention pertains to telecommunications, and particularly to prioritizing or expediting of data packets transmitted through an intermediate node, such as a radio base station node, of a telecommunications system.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

In a forum known as the Third Generation Partnership Project (3GPP), telecommunications suppliers propose and agree upon standards for third generation networks and UTRAN specifically, and investigate enhanced data rate and radio capacity. One result of the forum's work is the High Speed Downlink Packet Access (HSPA). The High Speed Packet Access (HSPA) enhances the WCDMA specification with High Speed Downlink Packet Access (HSDPA) in the downlink and Enhanced Dedicated Channel (E-DCH) in the uplink. These new channels are designed to support IP based communication efficiently, providing enhanced end-user performance and increased system capacity. Though originally designed for interactive and background applications, they provide as good or even better performance for conversational services than the existing circuit switched (CS) bearers.

Concerning High Speed Downlink Packet Access (HSDPA) generally, see, e.g., 3GPP TS 25.435 V9.2.0 (2010-06), 3rd Generation Partnership Project; Technical Specification Group Radio Access Network; UTRAN Iub Interface User Plane Protocols for Common Transport Channel Data Streams (Release 9), as well as 3GPP TS 25.306 V9.3.0 (2010-06), 3rd Generation Partnership Project; Technical Specification Group Radio Access Network; UE Radio Access capabilities (Release 9), all of which are which are incorporated herein by reference in its entirety.

HSDPA achieves higher data speeds by shifting some of the radio resource coordination and management responsibilities to the base station from the radio network controller. Those responsibilities include one or more of the following: shared channel transmission, higher order modulation, link adaptation, radio channel dependent scheduling, and hybrid-ARQ with soft combining.

In shared channel transmission, radio resources, like spreading code space and transmission power in the case of CDMA-based transmission, are shared between users using time multiplexing. A high speed-downlink shared channel is one example of shared channel transmission. One significant benefit of shared channel transmission is more efficient utilization of available code resources as compared to dedicated channels. Higher data rates may also be attained using higher order modulation, which is more bandwidth efficient than lower order modulation, when channel conditions are favorable.

The radio base station monitors for the channel quality (CQI) of the high-speed downlink shared channel (HS-DSCH) and manages a priority queue maintained at the radio base station. The base station's priority queue (PQ) stores data which is to be sent on the high-speed downlink shared channel (HS-DSCH) over the air interface to the mobile terminal. In addition, knowing from the monitor the carrier quality of the HS-DSCH, the base station sends to the control node messages which authorize the control node to send more HS-DSCH data frames to the radio base station.

The mobile terminal reports a channel quality indicator (CQI) to the radio base station in charge of the cell, which results in generation of capacity allocation control frames which are sent to the control node regularly and/or per need bases, e.g. at urgent transitions. The authorizing messages include a "capacity allocation" which can be expressed in various ways, such as in terms of either bitrate or credits, for example. For example, capacity allocation expressed in credits may refer to a number of MAC-d PDUs that the radio network controller (RNC) is allowed to transmit for the MAC-d flow. In response to these authorizing messages, the control node sends further HS-DSCH frames to the radio base station.

Thus, the data in the priority queues is sent from a control node to a radio base station in protocol data units (PDUs). A number of PDUs may be included in each high-speed downlink shared channel (HS-DSCH) data frame.

In WCDMA radio networks, the Radio Network Controller (RNC) is responsible for ensuring that data is available in the Radio Base Station (RBS) for transmission. To facilitate this, the RNC sends Radio Link Control (RLC) data via a Transport Network (TN) to the RBS. In state of the art solutions, the RNC controls the buffer fill level in the RBS by sending RLC PDU's to the RBS via a TN Frame Protocol (FP). While the RBS sends capacity allocations (CA) as input to this traffic shaping, it is still the RNC that controls how much data and at which rate this shall be sent to the RBS.

Since RLC is terminated in the RNC and in the user equipment unit (UE), any RLC data residing in an RBS queue is seen as delayed by the RLC entities involved in the data transmission. RLC timers are started when the data leaves the transmitting RLC entity and reset when an acknowledged by the receiving RLC entity has been received at the transmitting RLC entity. As a result of the delay, the RNC will (at poll timer expiry) poll data that has been transmitted from the RNC but is residing in the RBS queue and consequently not yet acknowledged by the UE. Thus if the amount of data in the RBS Priority Queue (PQ) is large and the data rate over the air interface (Uu) is low then the RLC entity in the RNC may will most likely poll the RLC entity in the UE even though no data has been lost. Consequently this will lead to unnecessary retransmissions of RLC PDU's or poll super field (POLL_SUFI's) as defined in 3GPP TS 25.322 V.9.2.0 (2010-

06), Technical Specification Group Radio Access Network, Radio Link Control (RLC) protocol specification (Release 9), incorporated herein by reference.

Related to RLC control messages there is a general issue when short control packets and data packets of varying length is queued in one queue. A control packet may be very short and will not require much radio resources to be successfully transmitted, but may have to wait for the transmission of a large user data packet. This situation may occur even if there is no congestion in the radio interface, it occurs only because it takes a certain time to transmit a large data packet.

An even more serious problem is posed by RLC retransmissions. If these are delayed by data already buffered in the priority queue (PQ) then this can lead to multiple requests for the same data even though the previously retransmitted data is already in transit but buffered in the RBS PQ. In this situation with delayed retransmissions, the UE may have time to send an additional RLC status report before the initial retransmission even has been transmitted to the UE over the air interface leading to a situation where multiple copies of the same data will be sent both over the TN and Uu interfaces. This results in an inefficient use of the TN and air interface resources since the additional copies of retransmitted RLC PDUs do not contribute to the user experienced throughput since they will be discarded by the receiving RLC entity in the UE.

A solution such as Distributed Active Queue Management (D-AQM which works on the principle of avoiding a queue build up in the RNC and forwarding data to the RBS as soon as possible has been proposed. The D-AQM proposed system will result in queuing in the RBS and not in the RNC. This is in contrast to prior art WCDMA flow control which attempts to limit the queue length in the RBS in order to avoid spurious RLC retransmissions as described above. Therefore, the RLC Round Trip Time (RTT) can be expected to vary over a greater range for a TN relying on D-AQM as opposed to a TN utilizing classic flow control. The RLC protocol does not support dynamic adaptation to the current measured delay, therefore a solution to handle this highly varying delay would be to increase the configured RLC timers but this would result in poor performance due to excessive polling delays in certain scenarios such as short data transmissions when only the last RLC PDU (which carries the poll) is lost.

While D-AQM attempts to adjust the PQ buffer length in the RBS to the Uu rate, typically targeting a certain buffer length or dwell time, the Uu bit rate for services over radio varies within large bounds over short periods of time and situations with large PQs and low Uu rates will thus occur. In such cases it will take time for the RBS to shorten the PQ and adjust to the lower rate leading to an increased RLC RTT and subsequent delay of RLC polls, RLC control PDU's and retransmissions. This is in turn may lead to wasted bandwidth both in the TN and RN due to the unnecessary transmission of polls and multiple copies of RLC retransmissions.

Therefore, state of the art solutions such as classic HS-DSCH flow control with distributed buffers or a D-AQM solutions will all take longer than necessary to convey RLC SDU data (e.g. TCP data) to higher layer since these RLC SDUs will, if RLC retransmissions occur, be delayed longer than necessary due to being placed last in the RBS PQ.

SUMMARY

In one of its aspects the technology disclosed herein concerns a method of operating a telecommunications node through which packets of differing priority are conveyed, such as a radio base station node, for example. In a basic form the method comprises receiving plural data packets from a source external to the node, the plural data packets including both ordinary packets and a priority packet; and storing the plural data packets in a queue structure in order of arrival so that the priority packet is read out of the queue structure before the ordinary packets are read out of the queue structure, thereby expediting output of the priority packet from the node relative to the ordinary packets.

In an example embodiment and mode the priority packet is a retransmission of an ordinary packet. In another example embodiment and mode the priority packet is a radio link control (RLC) status packet (such as a status report packet, for example).

In a separate expediting queue allocation mode the method basically comprises allocating an ordinary queue for the ordinary packets and a separate expediting queue for the priority packet, storing the ordinary packets at a tail of the ordinary queue in order of arrival and storing the priority packet at a tail of the expediting queue in order of arrival, and reading out all packets in from the expediting queue in order of arrival before reading any ordinary packet from the ordinary queue.

In an expediting subsection mode the method basically comprises allocating a subsection of a queue of the queue structure as an expediting subsection; storing the priority packet in order of arrival at a tail of the expediting subsection of the queue and storing the ordinary packets in order of arrival at a tail of a remainder of the queue; and reading out all priority packets from a head of the expediting subsection of the queue before reading any ordinary packets from the remainder queue.

In an example embodiment and mode the priority packet is included in a frame of a HS-DSCH channel, and ascertaining that a particular packet is a priority packet comprises checking one or more predetermined bits in the frame, the one or more predetermined bits having been set to indicate that the packet(s) of the frame is a priority packet. In one example implementation the frame is a HS-DSCH DATA FRAME TYPE 1, henceforth also referred to as a FP type 1, and the predetermined bits are bits 7 and 6 in a first payload octet of the HS-DSCH DATA FRAME TYPE 1 frame. In another example implementation, the frame is a HS-DSCH DATA FRAME TYPE 2, henceforth also referred to as a FP type 2 frame, and one or more predetermined bits are bits 4 and 3 in a fourth octet of the header of the FP type 2 frame.

In another example mode and embodiment, the priority packet is included in a frame of a HS-DSCH channel, the frame is a hybrid frame comprising both ordinary packets and at least one priority packet, the frame is a HS-DSCH DATA FRAME TYPE 1 frame, and ascertaining whether a packet of the hybrid frame is a priority packets comprises checking bits 7 and 6 in a first payload octet of each packet of the HS-DSCH DATA FRAME TYPE 1 frame.

In another example embodiment and mode, the priority packet is included in a frame of a HS-DSCH channel; the frame is a hybrid frame comprising both ordinary packets and at least one priority packet; and the frame is a HS-DSCH DATA FRAME TYPE 2 frame. In such example embodiment and mode the method further comprises ascertaining that a frame is the hybrid frame by checking one or more predetermined bits of the frame, the one or more predetermined bits of the frame comprising bits 4 and 3 in a fourth octet of the header of the HS-DSCH DATA FRAME TYPE 2 frame; and, ascertaining whether a packet of the hybrid frame is a priority packet comprises checking a predetermined bit in a predetermined field of the frame, the predetermined field being a field that specifies a number of packets in a specified block of the frame.

In another of its aspects the technology disclosed concerns a telecommunications node. The telecommunications node comprises a queue structure and a packet expediter. The queue structure is configured to store plural packets including ordinary packets and at least one priority packet. The packet expediter is configured to ascertain that a priority packet should be output from the node and to configured to store the priority packet in the queue structure so that the priority packet is read out of the queue structure before the ordinary packets are read out of the queue structure, thereby expediting output of the priority packet from the node relative to the ordinary packets.

In an example embodiment, the packet expediter comprises a resource allocation unit and a scheduler. The resource allocation unit is configured to allocate an ordinary queue for the ordinary packets and a separate expediting queue for the priority packet. The scheduler is configured to read out all packets from the expediting queue in order of arrival relative to other priority packets before reading any packet from the ordinary queue for the ordinary packets.

In another example embodiment, the packet expediter comprises a resource allocation unit; a queue manager; and a scheduler. The resource allocation unit is configured to allocate a subsection of a queue of the queue structure as an expediting subsection. The queue manager is configured to store the priority packet in the expediting subsection of the queue in order of arrival and to store the ordinary packets in a remainder of the queue in order of arrival. The scheduler is configured to read out all packets from the expediting subsection of the queue in order of arrival relative to other priority packets before reading any ordinary packets from the remainder queue.

In another of its aspects the technology disclosed herein concerns a method of operating a telecommunications node such as a radio network controller (RNC) node. In a basic form the method comprises generating a frame of packets to be sent to another node such as a radio base station (RBS), at least one packet of the frame being a priority packet that should be read out of a queue structure of the another node before non-priority ordinary packets are read out of the queue structure of the another node; and providing an indication in the frame that the frame includes the at least one priority packet.

In an example embodiment, the frame is for a HS-DSCH channel, and providing the indication comprises setting one or more predetermined bits in the frame. In an example implementation, the frame is a HS-DSCH DATA FRAME TYPE 1 frame, and the predetermined bits are bits 7 and 6 in a first payload octet of the HS-DSCH DATA FRAME TYPE 1 frame. In another example implementation, the frame is a HS-DSCH DATA FRAME TYPE 2 frame, and one or more predetermined bits are bits 4 and 3 in a fourth octet of the header of the HS-DSCH DATA FRAME TYPE 2 frame.

In an example embodiment and mode, the priority packet is included in a frame of a HS-DSCH channel, the frame is a hybrid frame comprising both ordinary packets and at least one priority packet, the frame is a HS-DSCH DATA FRAME TYPE 1 frame, and providing the indication comprises setting bits 7 and 6 in a first payload octet of each packet of the HS-DSCH DATA FRAME TYPE 1 frame.

In another example embodiment and mode, the priority packet is included in a frame of a HS-DSCH channel, the frame is a hybrid frame comprising both ordinary packets and at least one priority packet, the frame is a HS-DSCH DATA FRAME TYPE 2 frame, and the method further comprises indicating that a frame is the hybrid frame by setting one or more predetermined bits of the frame, the one or more predetermined bits of the frame comprising bits 4 and 3 in a fourth octet of the header of the HS-DSCH DATA FRAME TYPE 2 frame; and indicating that a packet of the hybrid frame is a priority packet comprises setting a predetermined bit in a predetermined field of the frame, the predetermined field being a field that specifies a number of packets in a specified block of the frame.

In another of its aspects the technology disclosed herein concerns a packet source node which comprises a frame generator and a communications interface. The frame generator is configured to generate a frame of packets to be sent to another node and to provide an indication in the frame that the frame comprises at least one priority packet that should be read out of a queue structure of the another node before non-priority ordinary packets are read out of the queue structure of the another node. The communications interface is configured for transmitting the frame to the another node.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
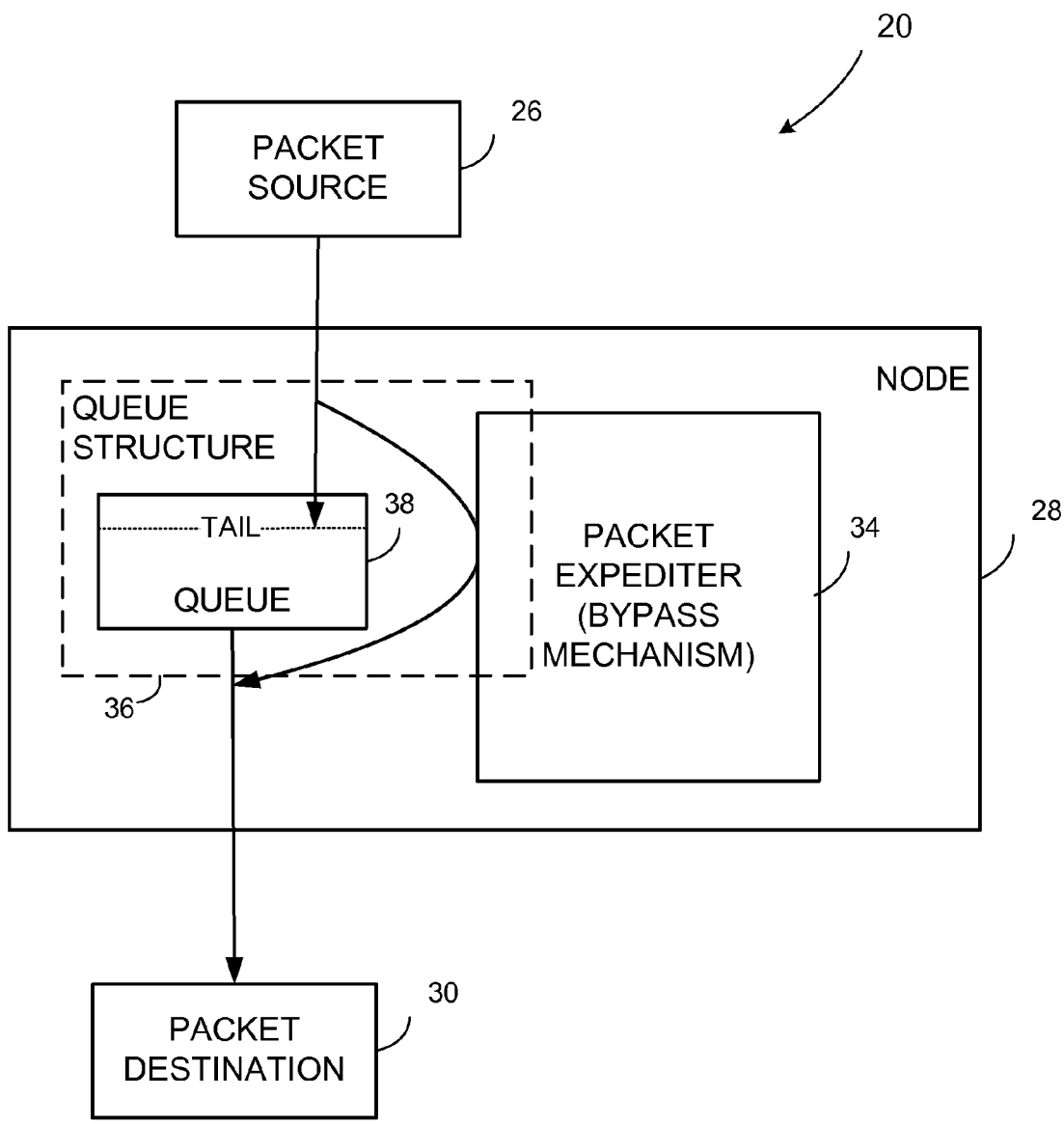
FIG. 1 is a diagrammatic view of a generic communications system wherein data packets are transmitted from a packet source through an intermediate node to a packet destination, wherein the intermediate node has a selective packet expediting capability/functionality.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

In its several aspects the technology disclosed herein ensures that data packets, such as RLC data, that is time critical is not delayed by lower priority data already buffered in a radio base station (RBS) node. This is achieved either (in a separate queue embodiment and mode) by setting up two instead of one priority queues (PQs) in the radio base station node or (in a subqueue embodiment and mode) by ensuring that higher priority RLC data bypasses the already buffered ordinary priority data in the existing priority queue.

FIG. 1 shows a generic communications system 20 wherein data packets are transmitted from packet source 26 through intermediate node 28 to packet destination 30, with the intermediate node 28 comprising a selective packet expediting capability/functionality 34 and queue structure 36. The queue structure 36 is configured to store plural packets including ordinary packets and at least one priority packet. The packet expediter 34 is also known herein as, e.g., "packet expediter 34" and "packet bypass mechanism". The packet expediter 34 is configured to ascertain that a packet obtained by intermediate node 28 from packet source 26 and to be output from intermediate node intermediate node 28 to packet destination 30 is a priority packet. Further intermediate node 28 is configured to store the priority packet in queue structure 36 so that the priority packet is read out of the queue structure before the ordinary packets are read out of queue structure 36, thereby expediting output of the priority packet from intermediate node 28 relative to the ordinary packets.

FIG. 1 illustrates queue structure 36 of intermediate node 28 as comprising queue 38. The queue 38 is conventional known as a priority queue (PQ), but (since queue 38 is conventionally used to store essentially all packets received by intermediate node 28 from packet source 26) the queue 38 is herein also known as the ordinary queue. Referring to queue 38 as the "ordinary queue" (rather than the "priority queue") eliminates confusion or interpretation that the queue 38 is necessarily required for storing the special or priority packets that are introduced by the technology disclosed herein. The special or priority packets that are expedited by packet expediter 34 and the technology disclosed herein are a subset of the stream of plural data packets received from packet source 26. The packets which are not expedited by packet expediter 34 are handled essentially in conventional fashion and are thus known as "ordinary packets". As explained herein, the special or priority packets can be, for example, a retransmission of an ordinary packet and/or radio link control (RLC) status packet (such as a status report packet, for example).

Figure 1A:
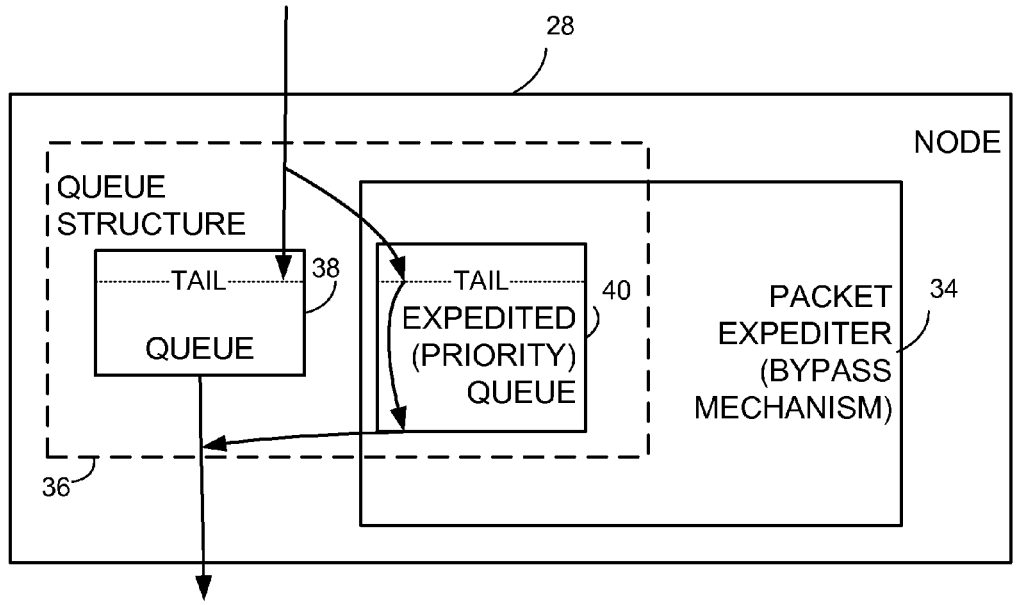
FIG. 1A is a diagrammatic view of an example a generic first embodiment of an intermediate node of FIG. 1.
Figure 1B:
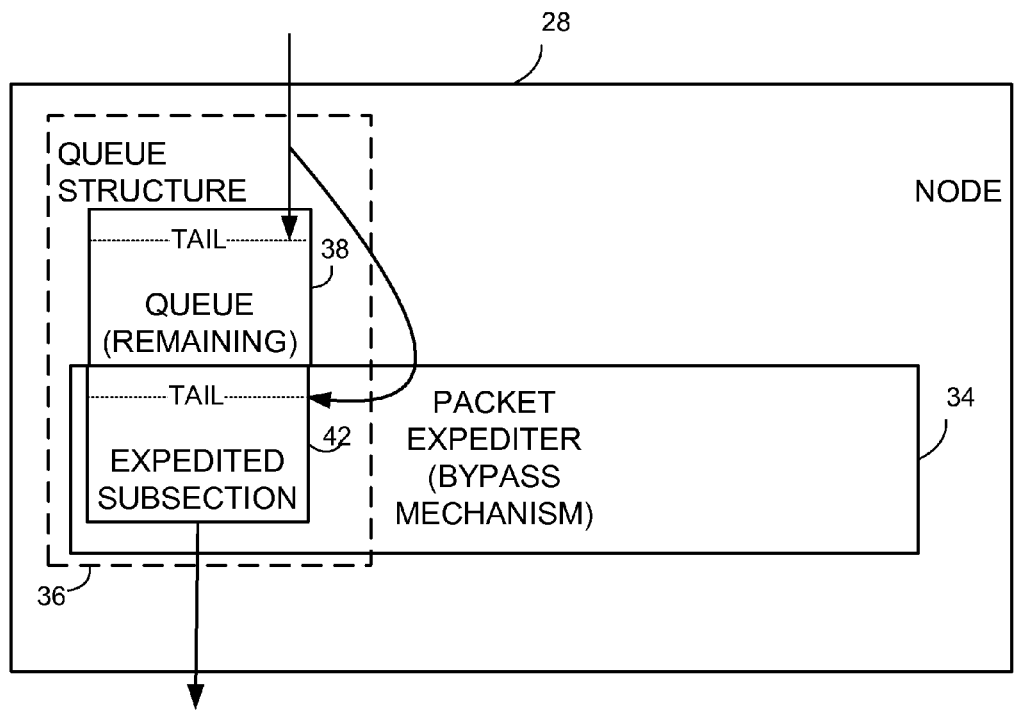
FIG. 1B is a diagrammatic view of an example a generic second embodiment of an intermediate node of FIG. 1.

Two different embodiments and modes of operation of packet expediter 34 are illustrated in FIG. 1A and FIG. 1B, respectively. In particular, FIG. 1A shows a separate queue embodiment and mode wherein ordinary packets are stored at a tail of queue 38 in order of arrival (e.g., each packet is stored at the position which is the tail of the queue when the packet arrives, and packets are stored at the respective tail position in order of arrival of the packets), but priority packets are stored in a separate expediting queue 40 of queue structure 36. As explained herein, the expediting queue 40 can be setup or established in queue structure 36 by packet expediter 34 on a dynamic basis. FIG. 1A shows that priority packets are stored at a tail of expediting queue 40 in order of arrival. The packet expediter 34 requires read out of all priority packets from a head of expediting queue 40 in order of arrival before reading out any ordinary packet from the ordinary queue 38.

FIG. 1B shows a subqueue embodiment and mode wherein the expediting queue 40 is configured to allocate a subsection of ordinary queue 38 as expediting subsection 42. As explained herein, the expediting subsection 42 can be setup or established in queue structure 36 by packet expediter 34 on a dynamic basis. Further, the packet expediter 34 stores the priority packet in order of arrival at a tail of expediting subsection 42 of queue 38. Ordinary packets are stored in order of arrival at a tail of a remainder of queue 38. The packet expediter 34 requires read out of all priority packets from a head of the expediting subsection 42 of queue 38 before reading any ordinary packets from the remainder of queue 38.

Figure 2:
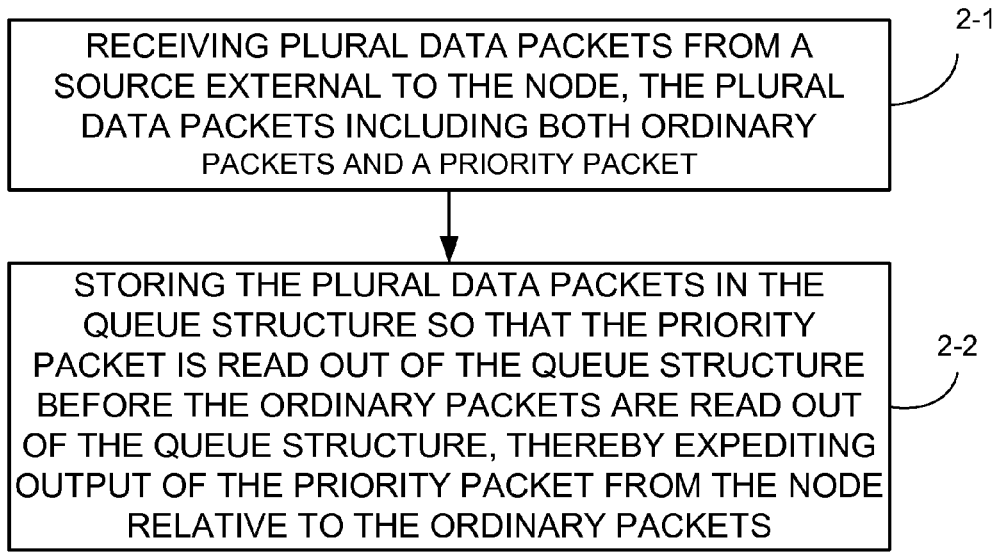
FIG. 2 is a flowchart illustrating example, representative acts or steps performed by an intermediate node which has a selective packet expediting capability/functionality.

FIG. 2 shows basic, representative acts or steps comprising a generic method of operating intermediate node 28 as illustrated in FIG. 1. Act 2-1 comprises receiving plural data packets from a source external to the node (e.g., packet source 26), the plural data packets including both ordinary packets and at least one priority packet. Act 2-2 comprises storing the plural data packets in the queue structure 36 in order of arrival and so that the priority packet is read out of the queue structure 36 before the ordinary packets are read out of the queue structure 36. Such storage and prioritized readout expedites output of the priority packet from the node 28 relative to the ordinary packets.

The storing of the ordinary packets may be in accordance with ordinary packet sequence number in the queue structure prior to read out of the ordinary packets. The method may further comprise an act of ascertaining that a priority packet should be output from the node.

Figure 2A:
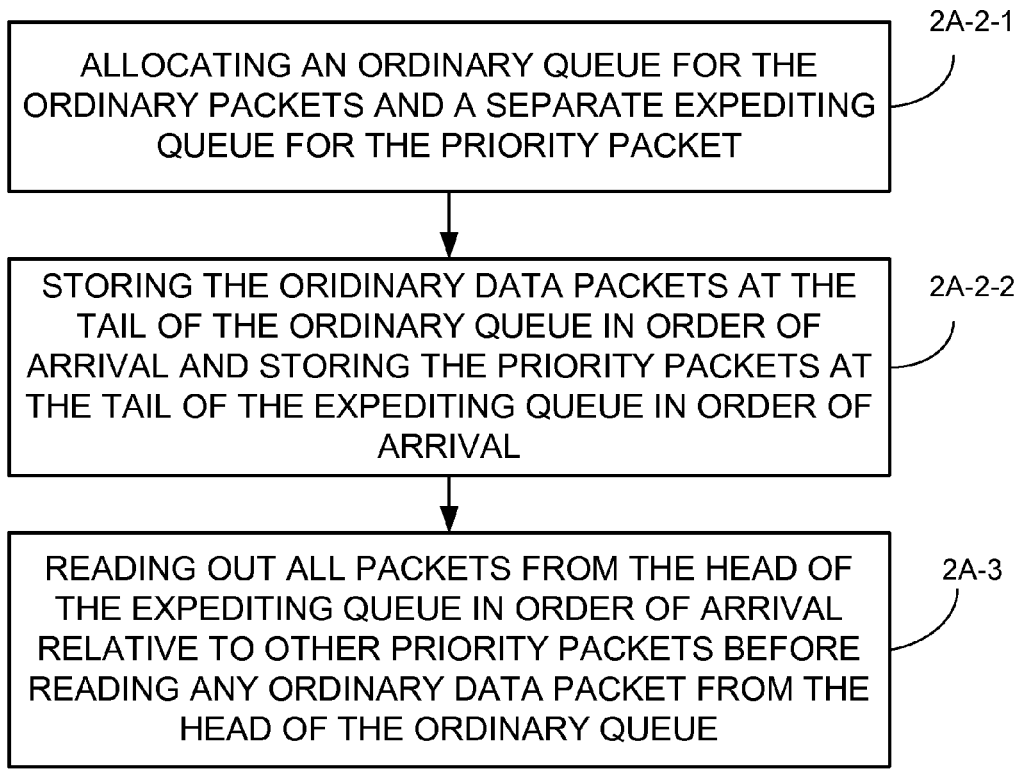
FIG. 2A is a flowchart illustrating example, representative acts or steps performed by the intermediate node of FIG. 1A.

FIG. 2A shows example, representative acts or steps performed by the intermediate node 28 of FIG. 1A, e.g., example acts of the separate queue embodiment and mode. Act 2A-2-1 comprises allocating the ordinary queue 38 for the ordinary packets and the separate expediting queue 40 (see FIG. 1A) for the priority packet. Act 2A-2-2 comprises storing the ordinary packets at a tail of the ordinary queue 38 (in order of arrival) and storing the priority packet at a tail of the expediting queue 40 (in order of arrival). Act 2A-3 comprises reading out all packets in from the expediting queue 40 (in order of arrival) before reading any ordinary packet from the ordinary queue 38.

Figure 2B:
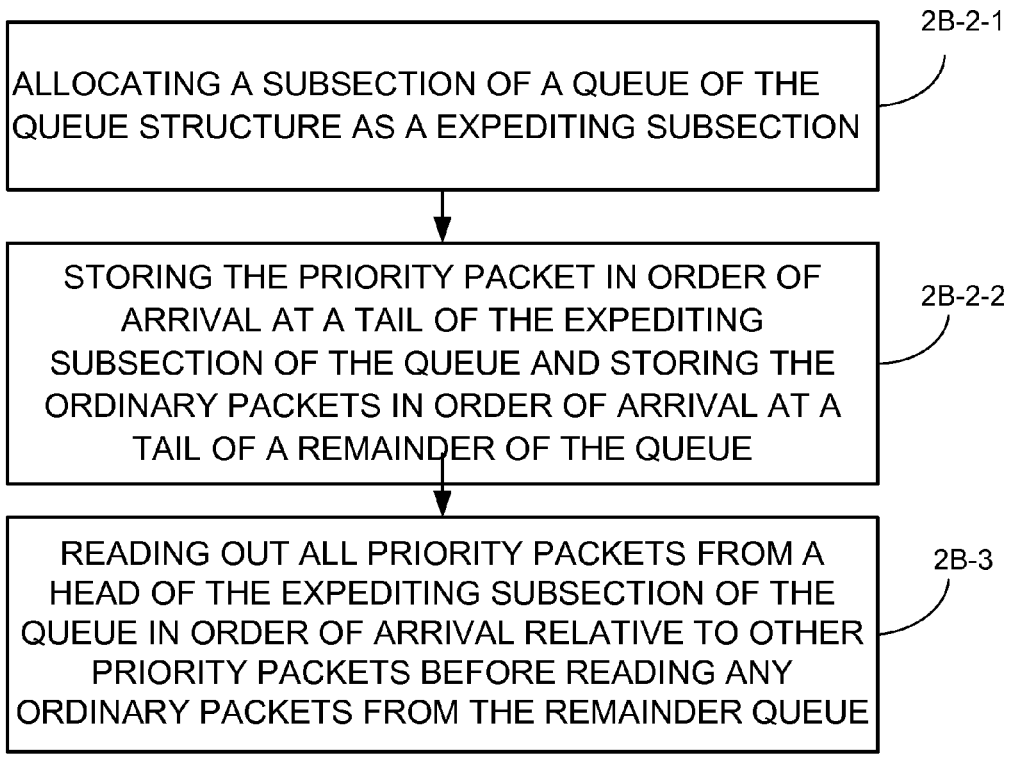
FIG. 2B is a flowchart illustrating example, representative acts or steps performed by the intermediate node of FIG. 1B.

FIG. 2B is a flowchart illustrating example, representative acts or steps performed by the intermediate node of FIG. 1B, e.g., example acts of the subqueue embodiment and mode. Act 2B-2-1 comprises allocating a subsection of queue 38 of queue structure 34 as the expediting subsection 42. Act 2B-2-2 comprises storing the priority packet in order of arrival at a tail of expediting subsection 42 of queue 38 and storing the ordinary packets in order of arrival at a tail of a remainder of the queue 38. Act 2B-3 comprises reading out all priority packets from a head of the expediting subsection 42 of queue 38 before reading any ordinary packets from the remainder of queue 38.

Figure 3:
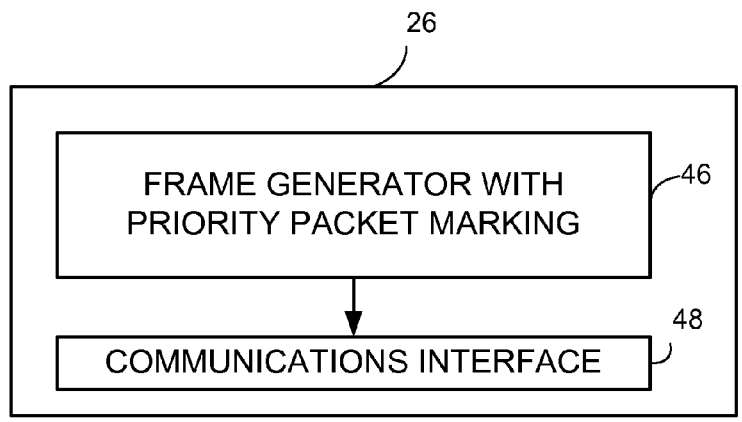
FIG. 3 is a diagrammatic view of a generic example embodiment of a priority packet marking packet source node.

The packet source 26 also plays a role in the technology disclosed herein, for example in marking certain packets as the priority packets which will be expedited by packet expediter 34 of intermediate node 28. To this end packet source 26 is also known herein as a priority packet marking packet source node. FIG. 3 shows a generic packet source 26 as comprising frame generator 46 and communications interface 48. The frame generator 46 is configured to generate a frame of packets to be sent to another node (e.g., to intermediate node 28) and to provide an indication in the frame that the frame comprises at least one priority packet that should be read out of queue structure 36 of intermediate node 28 before non-priority ordinary packets are read out of the queue structure 36. The communications interface 48 is configured for transmitting the frame to intermediate node 28.

As used herein, "frame" is terminology that encompasses any transmission unit that is comprised of or includes one or more packets (e.g., PDUs) that are transmitted from packet source 26 to intermediate node 28. Non-limiting examples of frame structures are described herein.

Figure 4:
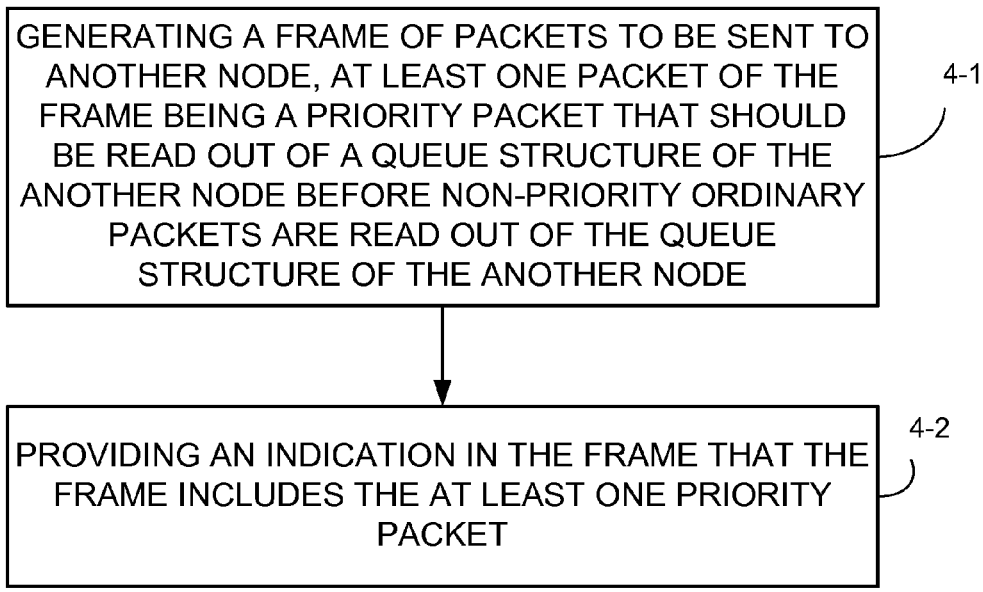
FIG. 4 is a flowchart illustrating example, representative acts or steps performed by the priority packet marking packet source node of FIG. 3.

FIG. 4 illustrates example, representative acts or steps performed by the priority packet marking packet source 26 of FIG. 3. Act 4-1 comprises generating a frame of packets to be sent to another node such as a radio base station (RBS) (e.g., intermediate node 28), at least one packet of the frame being a priority packet that should be read out of queue structure 36 of intermediate node 28 before non-priority ordinary packets are read out of the queue structure 36. Act 4-2 comprises the queue structure 36 providing an indication in the frame that the frame includes the at least one priority packet.

Figure 5A:
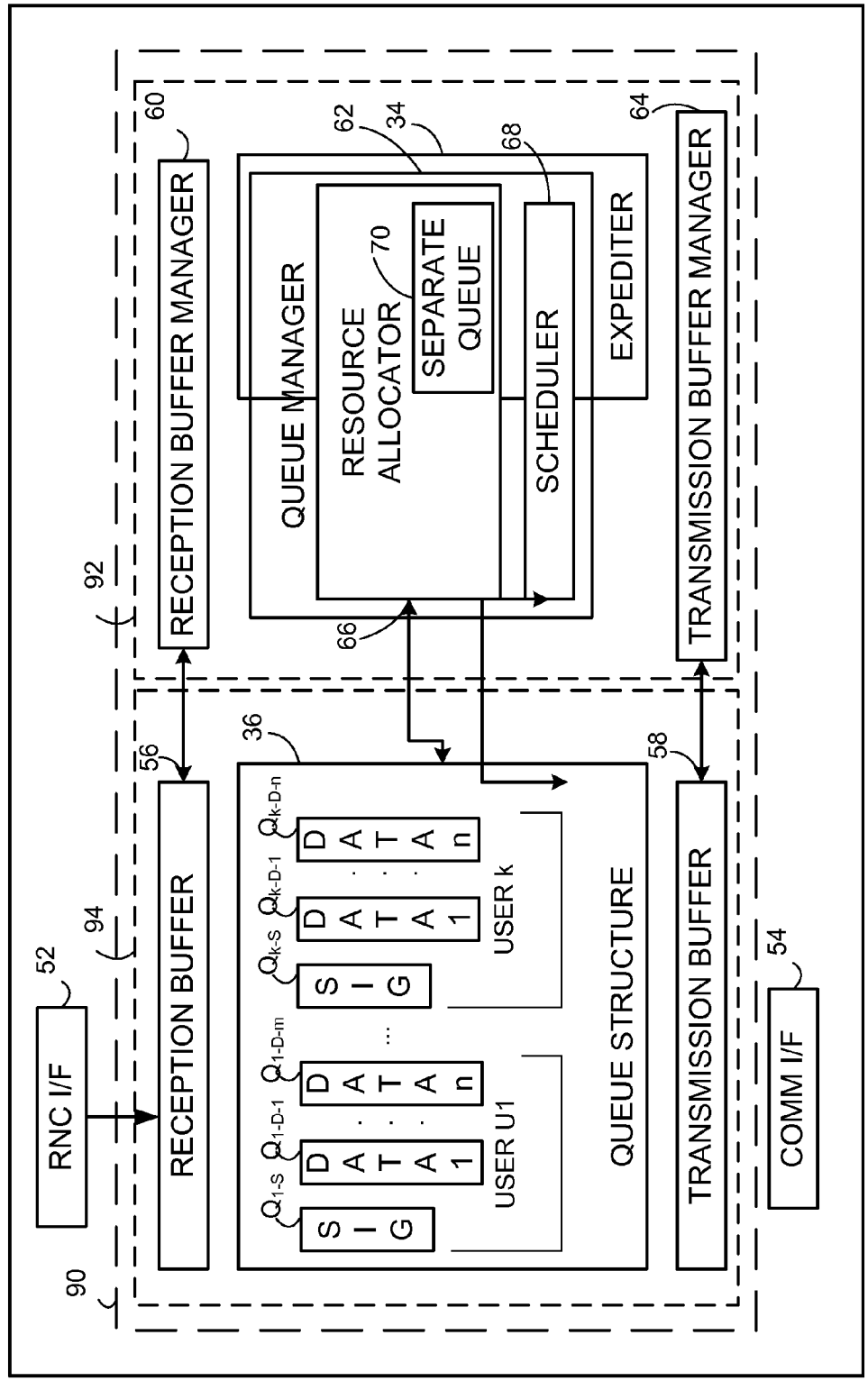
FIG. 5A is a schematic view of an example detailed implementation of the intermediate node of FIG. 1A.
Figure 5B:
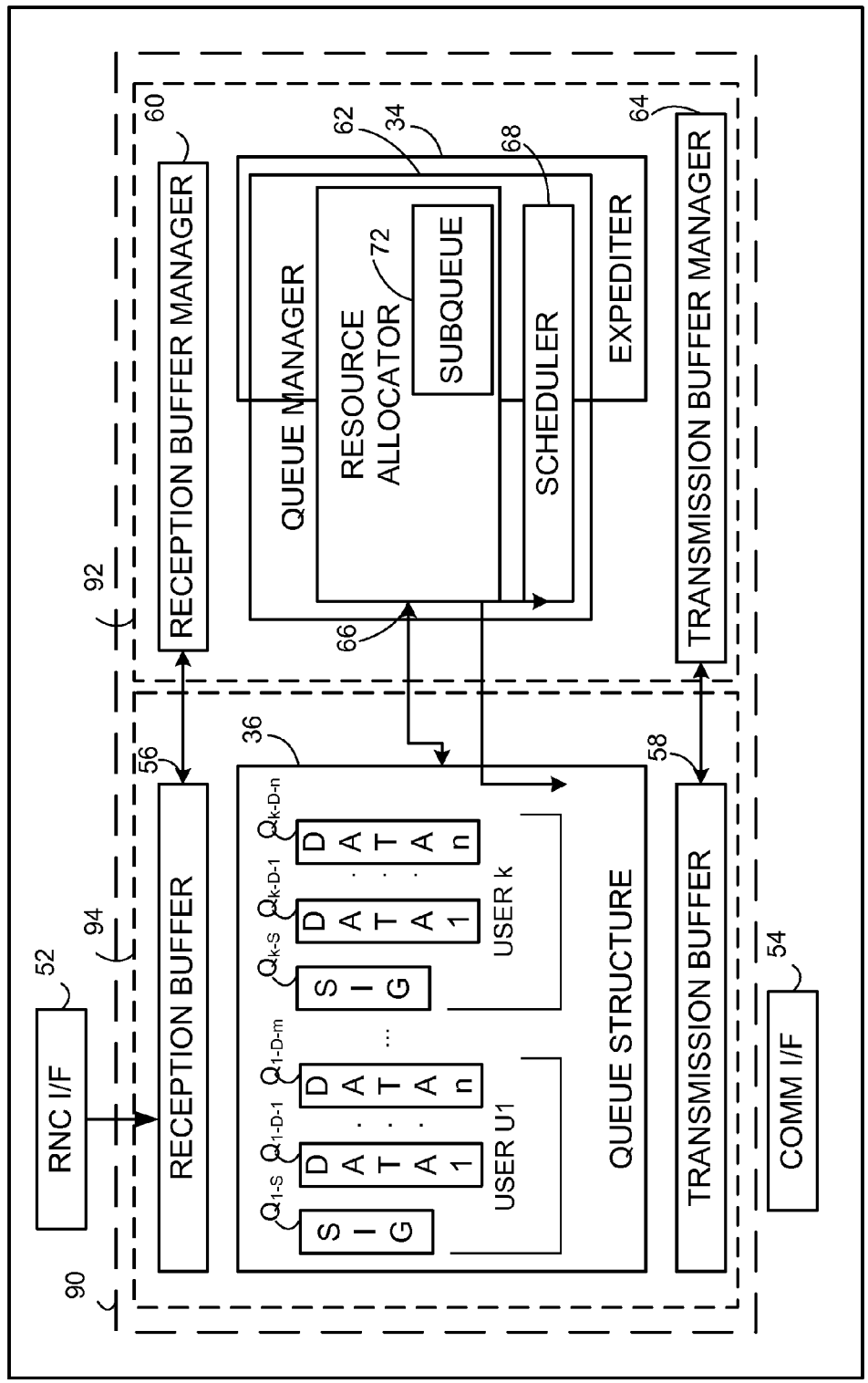
FIG. 5B is a schematic view of an example detailed implementation of the intermediate node of FIG. 1B.

In certain example implementations the intermediate node 28 takes the form of a radio base station (RBS) node which is compatible with the High Speed Downlink Packet Access (HSDPA) technology such as that aforedescribed. FIG. 5A shows an example embodiment of a HSDPA-capable radio base station node 28 which is configured to operate in accordance the separate queue embodiment and mode (see FIG. 1A and FIG. 2A); FIG. 5B shows an example embodiment of a HSDPA-capable radio base station node 28 which is configured to operate in accordance the subqueue embodiment and mode (see FIG. 1B and FIG. 2B). Since the embodiments of FIG. 5A and FIG. 5B essentially have the same structure unless otherwise noted, both embodiments are understood in conjunction with the ensuing discussion of the embodiment of FIG. 5B (similar elements and functionalities of the two embodiments being represented by same reference numerals).

As understood from general radio access network (RAN) technology, the radio base station nodes 28 of FIG. 5A and FIG. 5B receive packets from a radio network controller (RNC) node (which serves as the packet source 26) over a Iub interface and send packets to a mobile station or user equipment unit (UE) over a radio interface (the Uu interface). Therefore the radio base station nodes 28 comprise two communication interfaces, e.g., RNC interface 52 and UE interface 54. In route from RNC interface 52 to UE interface 54 the packets are first temporarily stored in reception buffer 56. The packets may be included in a frame or other transmission structure, which communicates to the intermediate node 28 information about the logical channels involved with the frame (e.g., the number of packets or PDUs that the frame carries for a first logical channel, the number of packets or PDUs that the frame carries for a second logical channel, etc.). Thereafter the packets are directed to queue structure 36 where the packets may be stored in sorted fashion based on destination/user and data type (an example manner of sorting and storing is explained hereinafter). Upon readout from queue structure 36 the packets are assembled into transmission blocks or other suitable transmission units in transmission buffer 58 prior to application to UE interface 54. For example, a transmission block can include data from the queue structure 36, a header (e.g., MAC protocol), as well as CRC and error correction encoding.

FIG. 5A and FIG. 5B further show that radio base station node 28 comprises reception buffer manager 60 for controlling or managing reception buffer 56; queue manager 62 for controlling or managing queue structure 36; and transmission buffer manager 64 for controlling or managing 58. The queue manager 62 in turn comprises queue resource allocator 66 and queue output scheduler 68. As shown by FIG. 5A and FIG. 5B, in example embodiments the packet expediter 34 is formed at least by portions of queue manager 62 including portions of queue resource allocator 66 and queue output scheduler 68.

As mentioned above, FIG. 5A shows an example embodiment of a HSDPA-capable radio base station node 28 which is configured to operate in accordance the separate queue embodiment and mode. Accordingly, the queue resource allocator 66 and packet expediter 34 of the FIG. 5A embodiment comprises separate queue allocator 70. Operation of the separate queue allocator 70 of FIG. 5A is understood with reference to FIG. 6A.

As mentioned above, FIG. 5B shows an example embodiment of a HSDPA-capable radio base station node 28 which is configured to operate in accordance the subqueue embodiment and mode. Accordingly, the queue resource allocator 66 and packet expediter 34 of the FIG. 5B embodiment comprises subqueue allocator 72. Operation of the subqueue allocator 72 of FIG. 5B is understood with reference to FIG. 6B.

FIG. 5A and FIG. 5B further illustrate the fact that typically queue structure 36 can serve many users, e.g. users USER 1-USER k, and that each user is generally allocated two or more queues in queue structure 36. Typically each user is allocated a queue for signaling data and one or more ordinary queues for user data. The signaling data queue is shown as a SIG queue for each user, e.g., queue $Q_{1-S}$ for USER 1, queue $Q_{k-S}$ for USER k. For each user there may be several different types of user data, e.g., interactive user data, streaming user data, and voice user data, for examples, and that each different type of user data corresponds to a different virtual channel. FIG. 5A and FIG. 5B show that in queue structure 36 that USER 1 has queues $Q_{1-D-1}$ through $Q_{1-D-m}$ for m number of virtual channels (data ["D"] types), and in similar fashion that USER 2 has queues $Q_{k-D-1}$ through $Q_{k-D-n}$ for n number of virtual channels. A packet received from the packet source 26 is sorted or routed to an appropriate queue based on information carried along with the packet in a frame structure, such information being (for example) a logical channel number or the like associated with the packet.

It should be understood that each one of the data queues shown in FIG. 5A and FIG. 5B can correspond to the queue 38 shown in the respective generic embodiments of FIG. 1A and FIG. 1B, and therefore that the acts and steps described with respect to the separate queue embodiment and mode method of FIG. 2A is applicable to any such data queue of FIG. 5A and that the acts and steps described with respect to the subqueue embodiment and mode method of FIG. 2B is applicable to any such data queue of FIG. 5B.

Figure 6A:
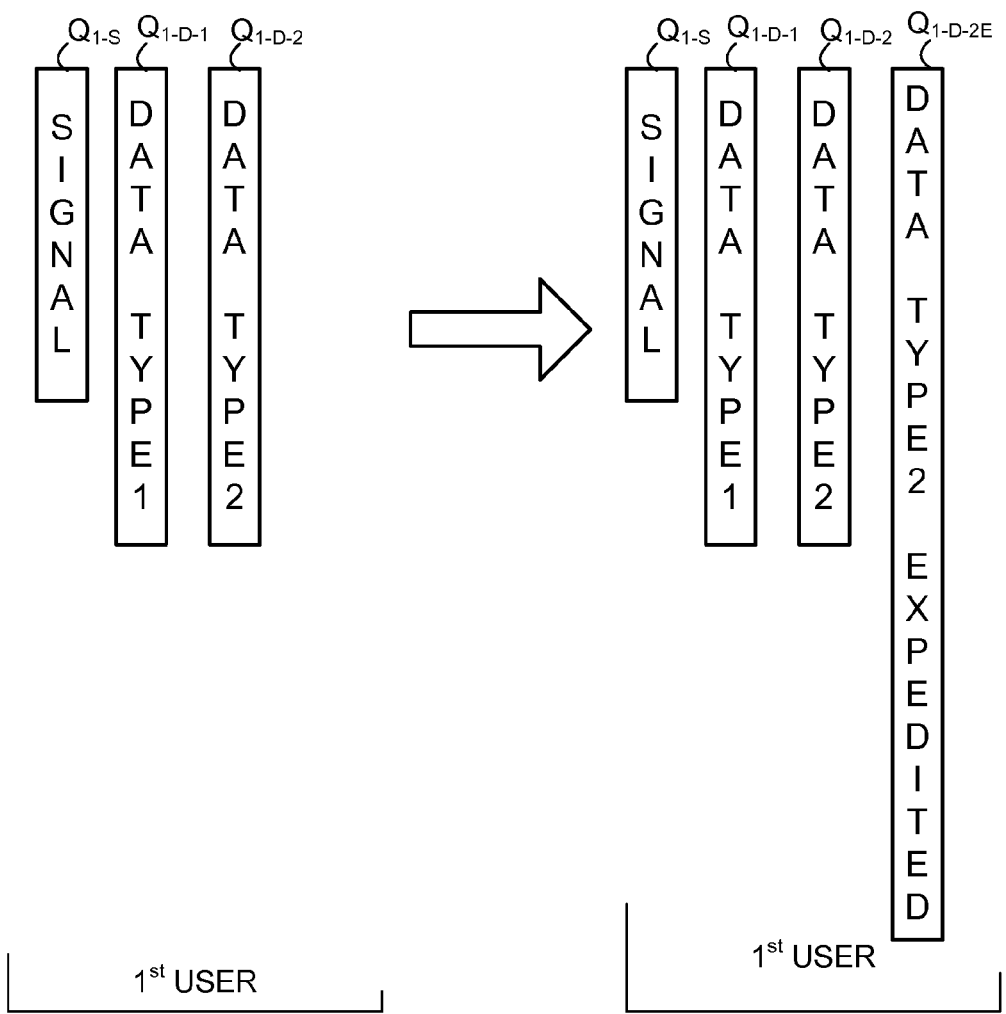
FIG. 6A is a diagrammatic view illustrating example allocation of an expediting queue within a queue structure of the intermediate node of FIG. 1A.

Operation of the separate queue allocator 70 of FIG. 5A is understood with reference to FIG. 6A. FIG. 6A shows that USER 1 begins with signaling data queue $Q_{1-S}$ and user data ordinary queues $Q_{1-D-1}$ through $Q_{1-D-2}$ for two number of virtual channels. The queue manager 62 knows in which of the user data ordinary queues $Q_{1-D-1}$ through $Q_{1-D-2}$ to store an incoming ordinary packet based on a scheduling priority indicator (SPI) associated with the incoming packet. Conventionally the scheduling priority indicator (SPI) has a value between zero and fifteen for indicating to which of several virtual channels the incoming packet belongs. But when packet expediter 34 detects that an incoming packet is a priority packet (e.g., a retransmission of an ordinary data packet or an RLC control packet), the separate queue allocator 70 creates a new and separate queue for the priority packet. For example, in FIG. 6A detection of an incoming priority packet for the virtual channel associated with queue $Q_{1-D-2}$ of USER 1 prompts separate queue allocator 70 to allocate new and separate queue $Q_{1-D-2E}$, which is an expedited queue to correspond to queue $Q_{1-D-2}$. The new and separate queue $Q_{1-D-2E}$ remains in existence as long as there are priority packets for the data type D-2, and is created when a first priority packet is received for the data type D-2, or when a priority packet is received at a time when no other priority packets for the data type D-2 are in queue structure 36 (after an earlier version of $Q_{1-D-2E}$ has been de-allocated).

Figure 6B:
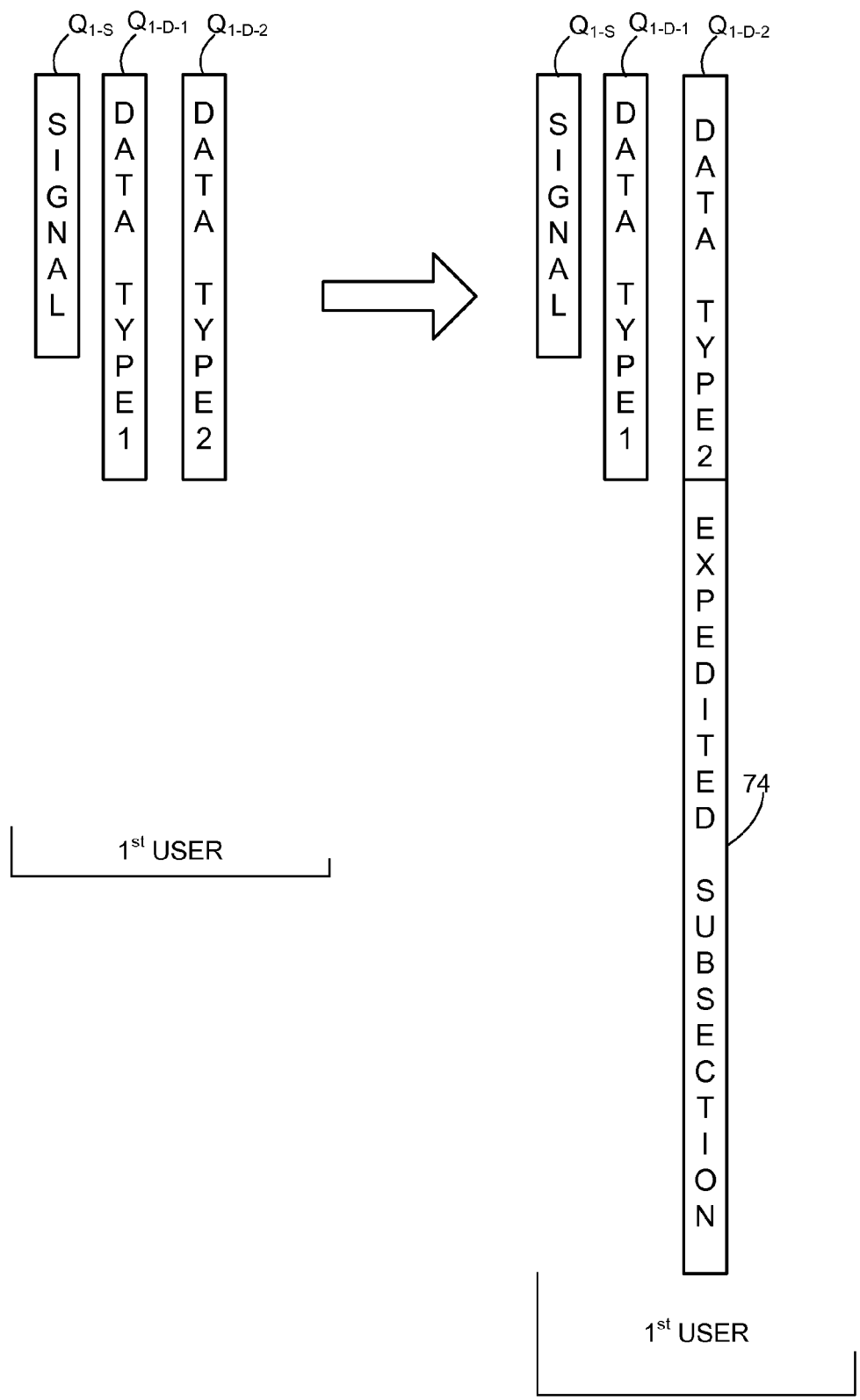
FIG. 6B is a diagrammatic view illustrating example allocation of an expediting subqueue within a queue structure of the intermediate node of FIG. 1B.

Operation of the subqueue allocator 72 of FIG. 5B is understood with reference to FIG. 6B. Like FIG. 6A, FIG. 6B shows that USER 1 begins with signaling data queue $Q_{1-S}$ and user data ordinary queues $Q_{1-D-1}$ through $Q_{1-D-2}$ for two number of virtual channels. But when packet expediter 34 detects that an incoming packet is a priority packet (e.g., a retransmission of an ordinary data packet or an RLC control packet), the subqueue allocator 72 creates a subsection or subqueue in an appropriate one of the queues. For example, in FIG. 6B detection of an incoming priority packet for the virtual channel associated with queue $Q_{1-D-2}$ of USER 1 prompts subqueue allocator 72 to allocate subqueue or subsection 74 of queue $Q_{1-D-2}$ in which to store the incoming priority packets. The subqueue or subsection 74 remains in existence as long as there are priority packets for the data type D-2, and is created when a first priority packet is received for the data type D-2, or when a priority packet is received at a time when no other priority packets for the data type D-2 are in queue structure 36 (after an earlier version of subqueue or subsection 74 has been de-allocated).

Figure 7:
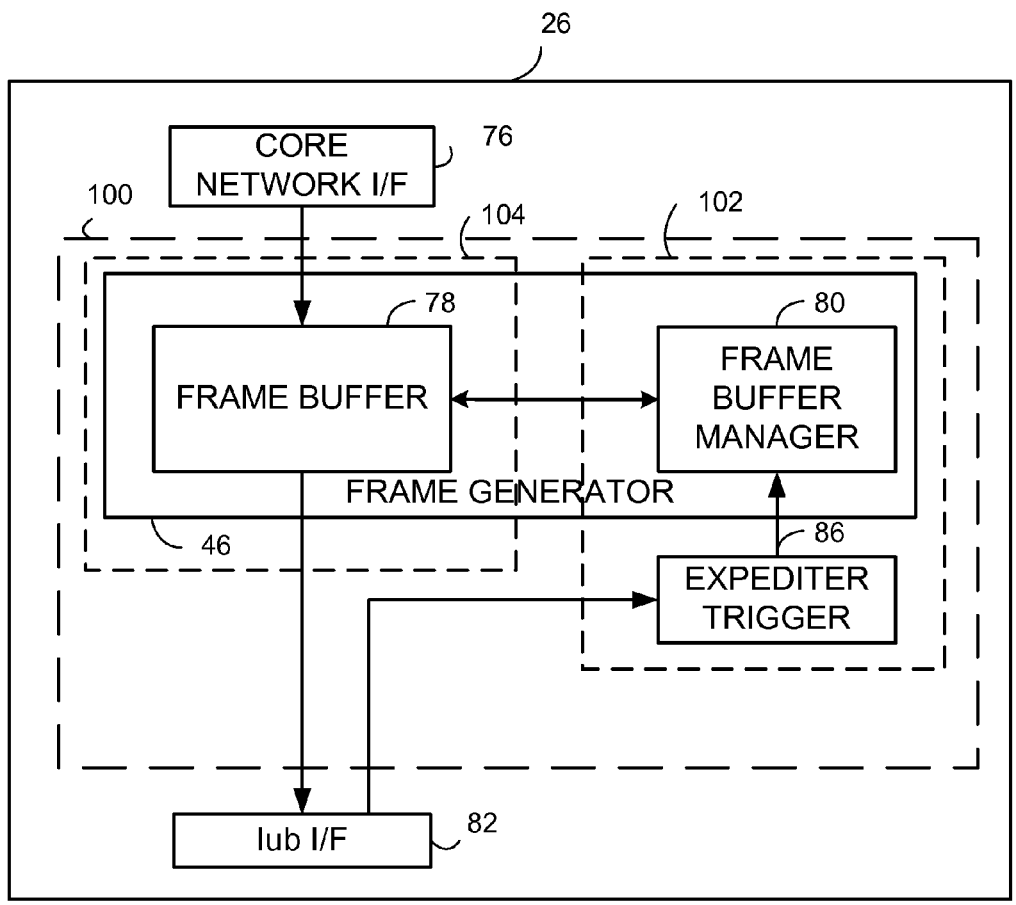
FIG. 7 is a diagrammatic view of a more detailed example embodiment of a priority packet marking packet source node which takes the form of a radio network controller (RNC) node.

In certain example implementations the packet source 26 takes the form of a radio network controller (RNC) node which is compatible with the High Speed Downlink Packet Access (HSDPA) technology such as that aforedescribed. To the extent here pertinent further example structural details of a radio network controller (RNC) node 26 are illustrated in FIG. 7. FIG. 7 particularly shows that radio network controller (RNC) 26 comprises a core network interface 76 through which radio network controller (RNC) 26 is connected to a core network and from which radio network controller (RNC) 26 receives, e.g., user data. The user data is applied to frame buffer 78 which is included in frame generator 46. The frame buffer 78 is managed or controlled by frame buffer manager 80, which serves to build or construct a frame or other suitable transmission unit for communication to intermediate node 28. Frames generated by frame generator 46 are transmitted through Iub interface 82 to the intermediate node 28, e.g., to a radio base station node. Information and/or signaling in received on an uplink through Iub interface 82 to indicate phenomena such as a requested retransmission of an ordinary data packet or that a RLC control signal needs to be generated or sent. Such uplink-received information or signaling is applied to a unit or functionality such can recognize and process the same, such as expediter trigger 86. The expediter trigger 86 then instructs frame generator 46, e.g., frame buffer manager 80, to mark a packet (such as a retransmitted packet or a RLC control packet) as a priority packet. The expediter trigger 86 can take the form of an RLC entity, as is known in the industry, and thus can be responsible for or participate in requested retransmissions of ordinary packets or sending of RLC control packets. Example, non-limiting techniques for marking a priority packet are discussed below.

FIG. 5A and FIG. 5B illustrate that, in some example embodiments, various structural elements and/or functionalities of intermediate node 28 (e.g., a radio base station node) can be provided on a machine platform 90 (the machine platform 90 is shown as framed by broken lines). The machine platform 90 can take any of several forms, such as (for example) a computer implementation platform or a hardware circuit platform. FIG. 5A and FIG. 5B particularly show machine platform 90 as being a computer platform wherein certain logic and functionalities of intermediate node 28 are implemented by one or more computer processors or controllers as those terms are herein expansively defined. In conjunction with the computer platform FIG. 5A and FIG. 5B show intermediate node 28 as comprising a processor section 92 (comprising one or more processors or controllers) and a memory section 94. Likewise, the packet source 26 (e.g., radio network controller (RNC) node) of FIG. 7 can also be realized by a platform 100 (framed by broken line). In a computer implementation the platform further comprises processor section 102 and memory section 104.

The terminology "platform" is a way of describing how the functional units of packet source 26 and intermediate node 28 can be implemented or realized by machine. One example platform 90, 100 is a computer implementation wherein one or more of the framed elements are realized by one or more processors which execute coded instructions in order to perform the various acts described herein. Although the example platforms 90 and 100 have been illustrated as computer-implemented or computer-based platforms, another example platform suitable for packet source 26 and intermediate node 28 is that of a hardware circuit, e.g., an application specific integrated circuit (ASIC) wherein circuit elements are structured and operated to perform the various acts described herein.

The HS-DSCH data transmitted from the radio network controller (RNC) 26 to the radio base station node 28 is either carried over a frame protocol type 1 (FP type 1 or HS-DSCH DATA FRAME TYPE 1) in the case when the RBS 28 is configured with MAC-hs or a FP type 2 (HS-DSCH DATA FRAME TYPE 2) when MAC-ehs is used. However, in both cases there are spare bits in the frame which are ignored by the current version of the standard. The properties of frames are defined in 3GPP TS 25.435 V9.2.0 (2010-06), 3rd Generation Partnership Project; Technical Specification Group Radio Access Network; UTRAN Iub Interface User Plane Protocols for Common Transport Channel Data Streams (Release 9), which is incorporated herein by reference.

The RLC protocol uses sequence numbering for user data packets, but not for control packets. Retransmitted packet have sequence numbers that already are out of sequence compared to the packets flow of RLC packets delivered to the UE without any retransmissions. The handling of sequence numbers on RLC level will therefore not be impacted if RLC control packets and packets that are retransmitted are scheduled ahead of normal not retransmitted RLC data packets.

In accordance with one of its aspects the technology disclosed herein assigns one or more of the spare bits a value that allows the radio base station node 26 to distinguish if the data received in the frame if of high or ordinary priority. In the separate queue embodiment and mode, the radio base station node 26 uses these bits to decide if the data contained should be sent to the ordinary queue (PQ) 38 or to a separate PQ (e.g., expediting queue 40) assigned for prioritized data. In the subqueue embodiment and mode, the RBS is still only configured with one queue (PQ) 38 for the MAC-d flow in question, but uses these spare bits to distinguish if the data contained is of ordinary priority, and thus destined for the tail of the PQ or, in the case of high priority data, destined to bypass the PQ and moved to the head of queue ready to be transmitted in the next available (Transmission Time Interval) TTI.

In an example embodiment, two spare bits are assigned for this purpose. In an example implementation, one possible mapping of these bits would is according to Table 1.

TABLE 1

| Example Mapping | |
| --- | --- |
| Bit value | Value assigned to bits |
| 00 | Legacy value, i.e. change, all data assigned same priority |
| 01 | Ordinary priority data |
| 10 | Higher priority data |

TABLE 1-continued

| Example Mapping | |
| --- | --- |
| Bit value | Value assigned to bits |
| 11 | Both high and ordinary priority data contained in frame (Used only for FP type 2, ignored by FP type 1) |

Figure 8:
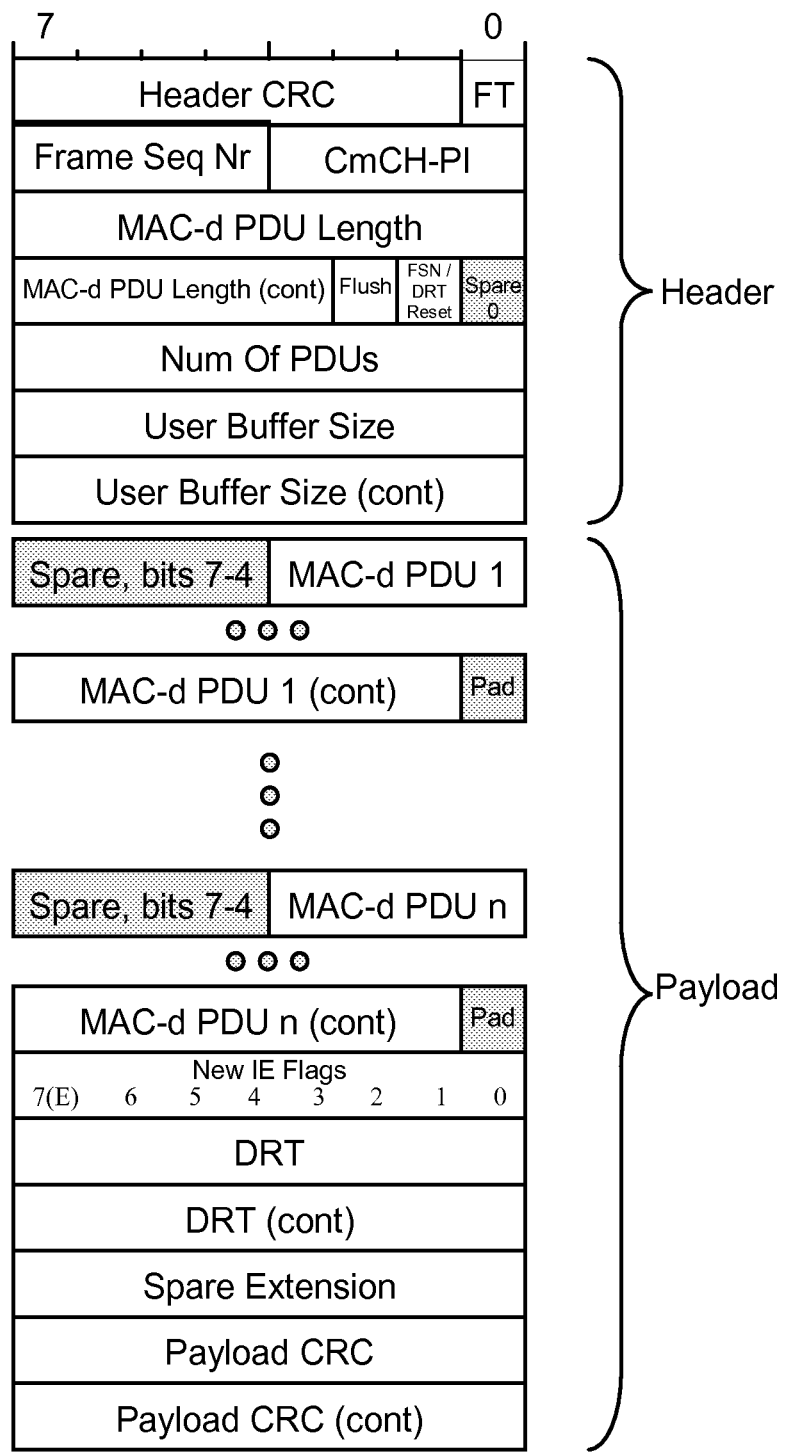
FIG. 8 is a diagrammatic view of a HS-DSCH DATA FRAME TYPE 1.

There are a number of spare bits in the FP type 1 (HS-DSCH DATA FRAME TYPE 1) that may be used; one possible embodiment is to use bits 7 and 6 in the first payload octet in the frame. See FIG. 8 section 6.2.6A of 3GPP TS 25.435 V9.2.0 (2010-06), 3rd Generation Partnership Project; Technical Specification Group Radio Access Network; UTRAN Iub Interface User Plane Protocols for Common Transport Channel Data Streams (Release 9) for further details concerning frame structure.

Figure 9:
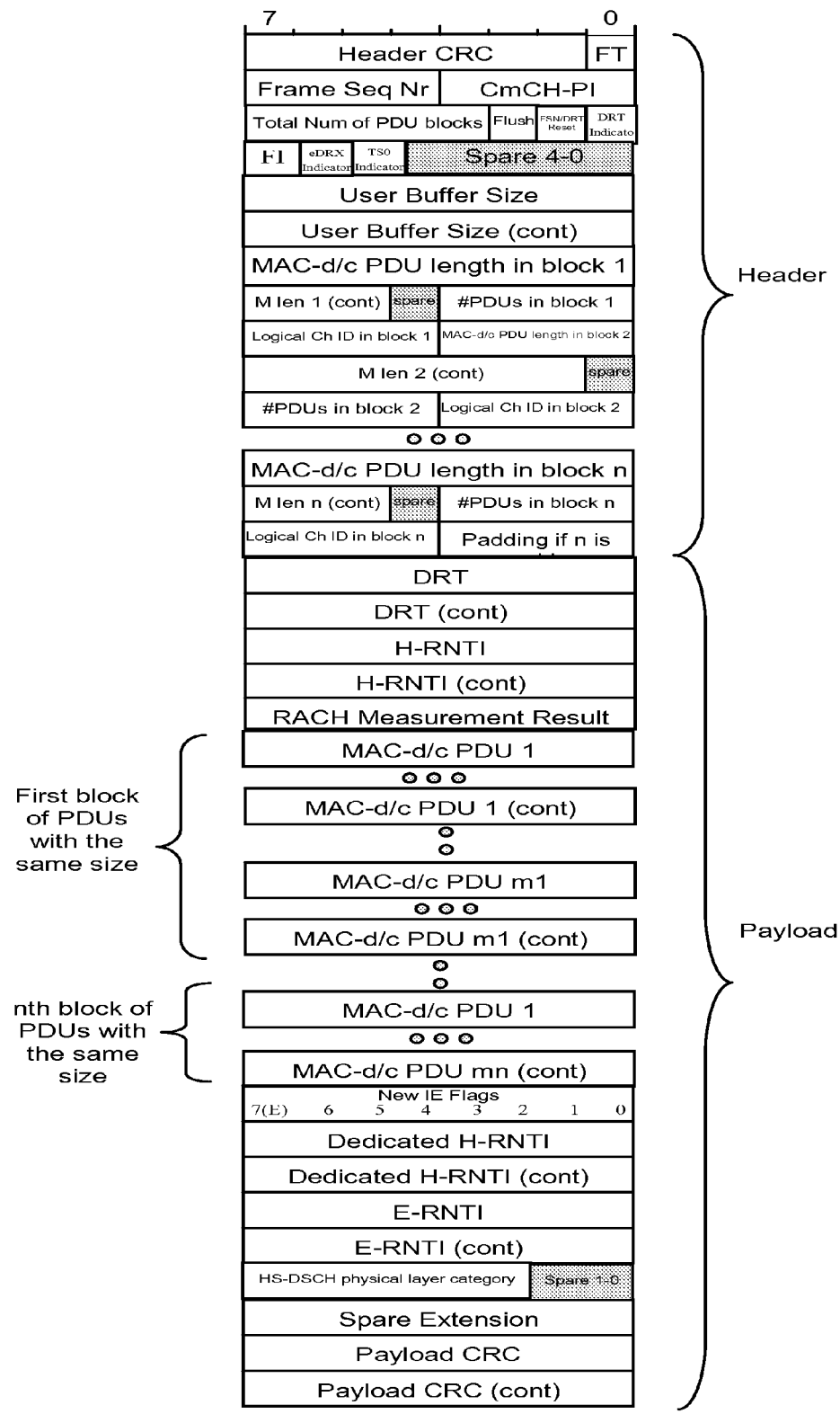
FIG. 9 is a diagrammatic view of a HS-DSCH DATA FRAME TYPE 2.

There are also a number of spare bits in the HS-DSCH DATA FRAME TYPE 2 (FP type 2) that may be used and one embodiment is to use bits 4 and 3 in the fourth header octet. See FIG. 9 and section 6.2.6A of 3GPP TS 25.435 V9.2.0 (2010-06), 3rd Generation Partnership Project; Technical Specification Group Radio Access Network; UTRAN Iub Interface User Plane Protocols for Common Transport Channel Data Streams (Release 9) for further details concerning frame structure.

While the above scheme has the merit of simplicity, it is only possible to send either ordinary or high priority data in a frame. If the radio network controller (RNC) 26 has both types of data to send to the radio base station node 28, in some example embodiments these must be sent in separate frames.

However, in further embodiments, both frame types (HS-DSCH DATA FRAME TYPE 1 and HS-DSCH DATA FRAME TYPE 2) can contain both high and ordinary priority data in the same frame by using a bit mapping scheme as outlined below.

For HS-DSCH DATA FRAME TYPE 1 this is achieved by using bits 7 and 6 in the first payload octet for each MAC-d PDU and using this to indicate priority for each individual MAC-d PDU in the same way as defined in Table 1.

For HS-DSCH DATA FRAME TYPE 2 this is achieved by using bits 4 and 3 in the fourth header octet to indicate that the payload contains both high and ordinary priority data. If bits 4 and 3 are set to 11 then the RBS shall use the value of bit 4 in the "#PDU's in block n" field to distinguish if data is high or ordinary priority. See Table 1, Table 2 and FIG. 9.

TABLE 2

| EXAMPLE MAPPING | |
| --- | --- |
| Value of bit 4 in field "#PDU's in block n" | Value assigned |
| 0 | Ordinary priority |
| 1 | High priority |

In another example embodiment two different forwarding behaviors are defined. These two different forwarding behaviors are similar to the definitions described in An Architecture for Differentiated Services, RFC 2474, and Configuration Guidelines for DiffSer Service Classes, RFC 4594. One forwarding behavior is that packets shall be sent without delay in a transmission buffer (corresponding to expedited forwarding in RFC 4594). This type of priority is suitable for short and critical RLC control packets. The other forwarding behavior provides a priority level to a packet when scheduled together with other packets of different priorities. The scheduler will use an algorithm to schedule the packets with different priorities. One well-known algorithm that allows packets to be scheduled with different priorities is the weighted fair queuing (WFQ) scheduling.

Using the above two types of forwarding behavior and several priority levels for the latter forwarding behavior, the spare bits can be used as shown in Table 3 for HS-DSCH DATA FRAME TYPE 1 and as shown in Table 4 for HS-DSCH DATA FRAME TYPE 2.

TABLE 3

USE OF SPARE BITS FOR HS-DSCH DATA FRAME TYPE 1

TYPE 1: Same as above (FIG. 8), use two spare bits for each MAC-d PDU with the following interpretation:
00 = scheduled with priority level low (or legacy)
01 = scheduled with priority level medium
10 = scheduled with priority level high
11 = expedited forwarding (no queuing in the scheduled queue)

TABLE 4

USE OF SPARE BITS FOR HS-DSCH DATA FRAME TYPE 2

TYPE2: Use three spare bits in the fixed header (FIG. 9) plus one spare bit indicating if priority shall be applied for a particular MAC-d PDU "1" applied, "0" not applied. Below the interpretation of the three bits in the fixed header is shown:
000 = all PDUs in the frame are scheduled with priority level low (or legacy)
001 = all PDUs in the frame are scheduled with priority level medium
010 = all PDUs in the frame are scheduled with priority level high
011 = all PDUs in the frame shall be handled with expedited forwarding (no queuing in the scheduled queue)
100 = PDUs marked with "1" are scheduled with priority level high and PDUs marked with "0" shall be scheduled with priority level medium
101 = PDUs marked with "1" are scheduled with priority level medium and PDUs marked with "0" shall be scheduled with priority level low
110 = PDUs marked with "1" are scheduled with priority level high and PDUs marked with "0" shall be scheduled with priority level low
111 = PDUs marked with "1" shall be handled with expedited forwarding (no queuing in the scheduled queue) PDUs marked with "0" shall be scheduled with priority level low.

To a person skilled in the art it is obvious that other definitions may be assigned and other spare bits in the FP used but the advantage over prior art as outlined in this invention disclosure is that the data sent from the RNC to the RBS in a particular MAC-d flow is handled in a different way depending on if it is assigned high or ordinary priority within the same priority queue, where ordinary priority is understood to be the priority as assigned to the logical channels of the MAC-d flows assigned to a particular priority queue.

This allows the radio base station node 26 to prioritize certain MAC-d PDUs (e.g. RLC retransmissions and RLC control PDUs) and to ensure that these are prioritized over other data already residing in a particular PQ.

This prioritization may either be implemented as usage of separate PQs in the radio base station node 26, one for high and one for ordinary priority, or as one PQ where the radio base station node 26 keeps track of which MAC-d PDUs in the PQ are high priority and which are ordinary priority.

The technology disclosed herein has many advantages. Some example advantages include the following:

Advantage: Improved throughput and latency characteristics, less bursty traffic, lower occurrence of spurious RLC retransmissions, quicker transport of RLC control PDU's such as reset, reset ACK's and RLC status reports. These benefits will be especially apparent in the cases when there are RLC retransmissions in conjunction with large PQ in the RBS such as with D-AQM or for high bit rate legacy HS-DSCH flow control solutions.

Advantage: Easy detection in a network by decoding the contents of the FP type 1 or 2 frames and logging if/how RLC retransmissions and/or RLC control PDUs are tagged in the FP and also how these specially tagged MAC-d PDU's are prioritized for transmission.

The technology disclosed herein is not only applicable to WCDMA but also to any other radio system using a similar scheme of a distributed protocol buffers similar to RLC.

The following abbreviations have the following corresponding meanings:
ACK Acknowledgement of reception
AM Acknowledged Mode (RLC)
NACK Negative acknowledgement of reception
PDU Protocol Data Unit
QoS Quality of Service
RB Radio Bearer
RBS Radio Base Station
RTT Round trip time
RLC Radio Link Control
RNC Radio Network Controller
SN Sequence Number
SRB Signaling Radio Bearer
SRNC Serving Radio Network Controller
SUFI Super Field (Defined in 3GPP TS 25.322 V.9.2.0 (2010-06), Technical Specification Group Radio Access Network, Radio Link Control (RLC) protocol specification (Release 9))
TCP Transfer Code Protocol
WCDMA Wideband Code Division Multiple Access Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

What is claimed is:

1. A method of operating a telecommunications node comprising:
  receiving plural data packets from a source external to the node, the plural data packets including both ordinary packets and a priority packet;
  storing the plural data packets in a queue structure in order of arrival so that the priority packet is read out of the queue structure before the ordinary packets are read out of the queue structure, thereby expediting output of the priority packet from the node relative to the ordinary packets;

wherein the priority packets is included in a frame of a HS-DSCH channel, and wherein ascertaining that a particular packet is a priority packet comprises checking one or more predetermined bits in the frame, the one or more predetermined bits having been set to indicate that the packet(s) of the frame is a priority packet;

wherein the frame is at least one of:
(1) a HS-DSCH DATA FRAME TYPE 1 frame, wherein the predetermined bits are bits 7 and 6 in a first payload octet of the HS-DSCH DATA FRAME TYPE 1 frame;
(2) a HS-DSCH DATA FRAME TYPE 2 frame, and wherein one or more predetermined bits are bits 4 and 3 in a fourth octet of the header of the HS-DSCH DATA FRAME TYPE 2 frame.

2. A method of operating a telecommunications node comprising:

receiving plural data packets from a source external to the node, the plural data packets including both ordinary packets and a priority packet;

storing the plural data packets in a queue structure in order of arrival so that the priority packet is read out of the queue structure before the ordinary packets are read out of the queue structure, thereby expediting output of the priority packet from the node relative to the ordinary packets;

wherein the priority packet is included in a frame of a HS-DSCH channel, wherein the frame is a hybrid frame comprising both ordinary packets and at least one priority packet, wherein the frame is a HS-DSCH DATA FRAME TYPE 1 frame, and wherein ascertaining whether a packet of the hybrid frame is a priority packets comprises checking bits 7 and 6 in a first payload octet of each packet of the HS-DSCH DATA FRAME TYPE 1 frame.

3. The method of claim 2, wherein bits 7 and 6 in the first payload octet of each packet of the HS-DSCH DATA FRAME TYPE 1 frame have values which map to the following situations:
all packets in the frame have ordinary priority;
all packets in the frame have high priority;
the frame comprises packets of both ordinary priority and high priority.

4. The method of claim 2, wherein bits 7 and 6 in the first payload octet of each packet of the HS-DSCH DATA FRAME TYPE 1 frame have values which indicate at least one of three priority levels for the packet, the three priority levels including a low level, a medium level, and a high level.

5. A method of operating a telecommunications node comprising:

receiving plural data packets from a source external to the node, the plural data packets including both ordinary packets and a priority packet;

storing the plural data packets in a queue structure in order of arrival so that the priority packet is read out of the queue structure before the ordinary packets are read out of the queue structure, thereby expediting output of the priority packet from the node relative to the ordinary packets;

wherein the priority packet is included in a frame of a HS-DSCH channel, wherein the frame is a hybrid frame comprising both ordinary packets and at least one priority packet, wherein the frame is a HS-DSCH DATA FRAME TYPE 2 frame, and further comprising:

ascertaining that a frame is the hybrid frame by checking one or more predetermined bits of the frame, the one or more predetermined bits of the frame comprising bits 4 and 3 in a fourth octet of the header of the HS-DSCH DATA FRAME TYPE 2 frame;

ascertaining whether a packet of the hybrid frame is a priority packet comprises checking a predetermined bit in a predetermined field of the frame, the predetermined field being a field that specifies a number of packets in a specified block of the frame.

6. A telecommunications node comprising:

a queue structure in which are stored plural packets including ordinary packets and at least one priority packet;

a packet expediter configured to ascertain that a priority packet should be output from the node and to configured to store the priority packet in the queue structure so that the priority packet is read out of the queue structure before the ordinary packets are read out of the queue structure, and thereby expediting output of the priority packet from the node relative to the ordinary packets;

wherein the priority packet is included in a frame of a HS-DSCH channel, and wherein the packet expediter is configured to ascertain that a particular packet is a priority packet by checking one or more predetermined bits in the frame, the one or more predetermined bits having been set to indicate that the packet(s)of the frame is a priority packet;

wherein the frame is a lease one of:
(1) a HS-DSCH DATA FRAME TYPE 1 frame, wherein the predetermined bits are bits 7 and 6 in a first payload octet of the HS-DSCH DATA FRAME TYPE 1 frame;
(2) a HS-DSCH DATA FRAME TYPE 2 frame, wherein one or more predetermined bits are bits 4 and 3 in a fourth octet of the header of the HS-DSCH DATA FRAME TYPE 2 frame.

7. A method of operating a telecommunications node comprising:

generating a frame of packets to be sent to another node, at least one packet of the frame being a priority packet that should be read out of a queue structure of the another node before non-priority ordinary packets are read out of the queue structure of the another node:

providing an indication in the frame that the frame includes the at least one priority packet:

wherein providing the indication comprises setting one or more predetermined bits in the frame: and wherein the frame is at lease one of:
(1) a HS-DSCH DATA FRAME TYPE 1 frame, wherein the predetermined bits are bits 7 and 6 in a first payload octet of the HS-DSCH DATA FRAME TYPE 1 frame;
(2) a HS-DSCH DATA DRAME TYPE 2 frame, and wherein one or more predetermined bits are bits 4 and 3 in a fourth octet of the header of the HS-DSCH DATA FRAME TYPE 2 frame.

8. A method of operating a telecommunications node comprising:

generating a frame of packets to be sent to another node, at least one packet of the frame being a priority packet that should be read out of a queue structure of the another node before non-priority ordinary packets are read out of the queue structure of the another node:

providing an indication in the frame that the frame includes the at least one priority packet; and wherein the priority packet is included in a frame of a HS-DSCH channel, wherein the frame is a hybrid frame comprising both ordinary packets and at least one priority packet, wherein the frame is a HS-DSCH DATA FRAME TYPE 1 frame, and wherein providing the indication comprises setting bits 7 and 6 in a first payload octet of each packet of the HS-DSCH DATA FRAME TYPE 1 frame.

9. A method of operating a telecommunications node comprising:
generating a frame of packets to be sent to another node, at least one packet of the frame being a priority packet that should be read out of a queue structure of the another node before non-priority ordinary packets are read out of the queue structure of the another node:
providing an indication in the frame that the frame includes the at least one priority packet; and
wherein the priority packet is included in a frame of a HS-DSCH channel, wherein the frame is a hybrid frame comprising both ordinary packets and at least one priority packet, wherein the frame is a HS-DSCH DATA FRAME TYPE 2 frame, and further comprising:
indicating that a frame is the hybrid frame by setting one or more predetermined bits of the frame, the one or more predetermined bits of the frame comprising bits 4 and 3 in a fourth octet of the header of the HS-DSCH DATA FRAME TYPE 2 frame;
indicating that a packet of the hybrid frame is a priority packet comprises setting a predetermined bit in a predetermined field of the frame, the predetermined field being a field that specifies a number of packets in a specified block of the frame.

10. A node of a telecommunications system comprising:
a frame generator configured to generating a frame of packets to be sent to another node and to provide an indication in the frame that the frame comprises at least one priority packet should be read out of a queue structure of the another node before non-priority ordinary packets are read out of the queue structure of the another node;
a communications interface configured to transmitting the frame to the another node;
wherein the priority packet is included in a frame of a HS-DSCH channel, and wherein the packet expediter is configured to ascertain that a particular packet is a priority packet by checking one or more predetermined bits in the frame, the one or more predetermined bits having been set to indicate that the packet(s)of the frame is a priority packet:
wherein the frame at least one of:
(1) a HS-DSCH DATA FRAME TYPE 1 frame, and wherein the predetermined bits are bits 7 and 6 in a first payload octet of the HS-DSCH DATA FRAME TYPE 1 frame; or
(2) a HS-DSCH DATA FRAME TYPE 2 frame, and wherein one or more predetermined bits are bits 4 and 3 in a fourth octet of the header of the HS-DSCH DATA FRAME TYPE 2 frame.

11. A telecommunications node comprising:
a queue structure in which are stored plural packets including ordinary packets and at least one priority packet;
a packet expediter configured to ascertain that a priority packet should be output from the node and to configured to store the priority packet in the queue structure so that the priority packet is read out of the queue structure before the ordinary packets are read out of the queue structure, and thereby expediting output of the priority packet from the node relative to the ordinary packets;
wherein the priority packet is included in a frame of a HS-DSCH channel, wherein the frame is a hybrid frame comprising both ordinary packets and at least one priority packet, wherein the frame is a HS-DSCH DATA FRAME TYPE 1 frame;
wherein the packet expediter is configured to ascertain whether a packet of the hybrid frame is a priority packets by checking bits 7 and 6 in a first payload octet of each packet of the HS-DSCH DATA FRAME TYPE 1 frame.

12. The node of claim 11, wherein bits 7 and 6 in the first payload octet of each packet of the HS-DSCH DATA FRAME TYPE 1 frame have values which map to the following situations:
all packets in the frame have ordinary priority;
all packets in the frame have high priority;
the frame comprises packets of both ordinary priority and high priority.

13. The node of claim 11, wherein bits 7 and 6 in the first payload octet of each packet of the HS-DSCH DATA FRAME TYPE 1 frame have values which indicate at least one of three priority levels for the packet, the three priority levels including a low level, a medium level, and a high level.

14. A telecommunications node comprising:
a queue structure in which are stored plural packets including ordinary packets and at least one priority packet;
a packet expediter configured to ascertain that a priority packet should be output from the node and to configured to store the priority packet in the queue structure so that the priority packet is read out of the queue structure before the ordinary packets are read out of the queue structure, and thereby expediting output of the priority packet from the node relative to the ordinary packets;
wherein the priority packet is included in a frame of a HS-DSCH channel, wherein the frame is a hybrid frame comprising both ordinary packets and at least one priority packet, wherein the frame is a HS-DSCH DATA FRAME TYPE 2 frame;
wherein the packet expediter is configured to ascertain whether a frame is a hybrid frame by checking one or more predetermined bits of the frame, the one or more predetermined bits of the frame comprising bits 4 and 3 in a fourth octet of the header of the HS-DSCH DATA FRAME TYPE 2 frame;
wherein the packet expediter is configured to ascertain whether a packet of the hybrid frame is a priority packet comprises checking a predetermined bit in a predetermined field of the frame, the predetermined field being a field that specifies a number of packets in a specified block of the frame.

* * * * *

UNITED STATES PATENT AND TRADEMARK OFFICE
CERTIFICATE OF CORRECTION

PATENT NO.       : 8,737,415 B2                                    Page 1 of 1
APPLICATION NO.  : 13/170368
DATED            : May 27, 2014
INVENTOR(S)      : Jonsson et al.

It is certified that error appears in the above-identified patent and that said Letters Patent is hereby corrected as shown below:

In the Claims

In Column 18, Line 26, in Claim 6, delete "a lease" and insert -- at least --, therefor.

In Column 18, Line 46, in Claim 7, delete "at lease" and insert -- at least --, therefor.

In Column 19, Line 10, in Claim 9, delete "node:" and insert -- node; --, therefor.

Signed and Sealed this
Thirty-first Day of March, 2015

Michelle K. Lee
*Director of the United States Patent and Trademark Office*